May 4, 1971     D. L. PEARL ET AL     3,577,495
EGG CARTON FORMING METHOD
Filed July 28, 1969     3 Sheets-Sheet 1
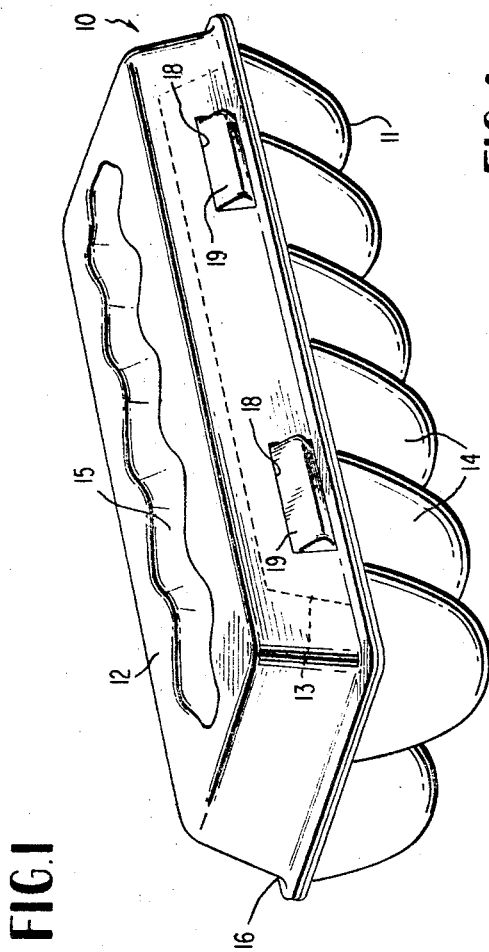
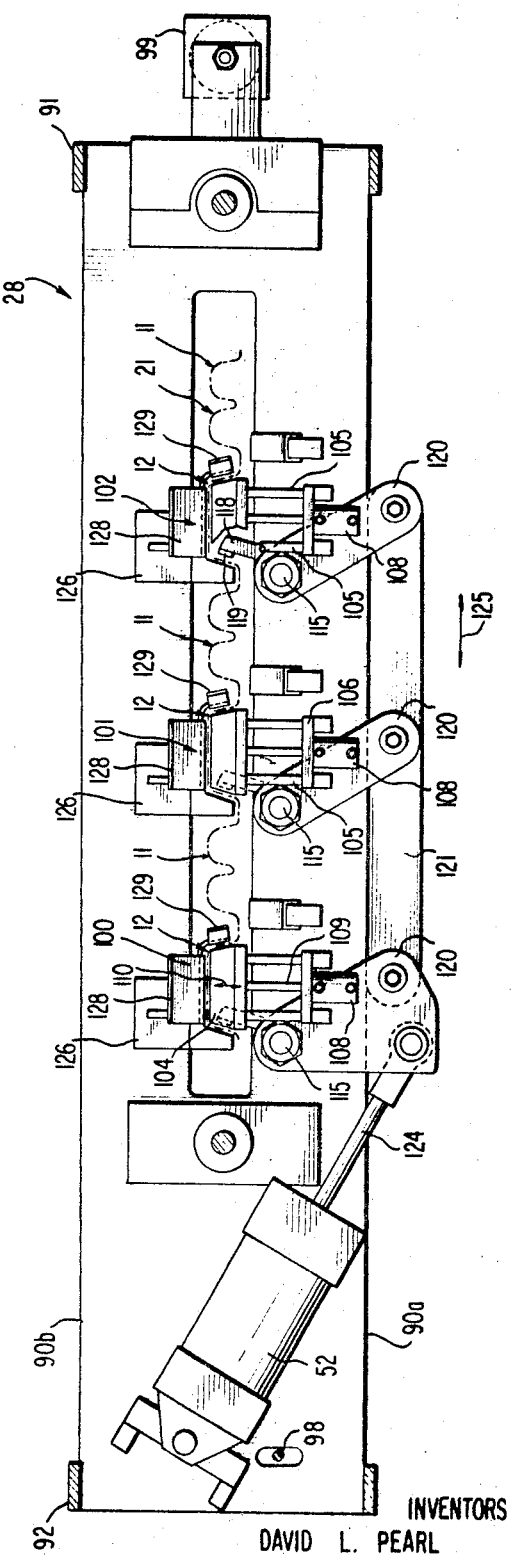
INVENTORS
DAVID L. PEARL
BEVERLY P. HEAD, JR.
JOHN G. WALLER
BY *Jones & Thomas*
ATTORNEYS

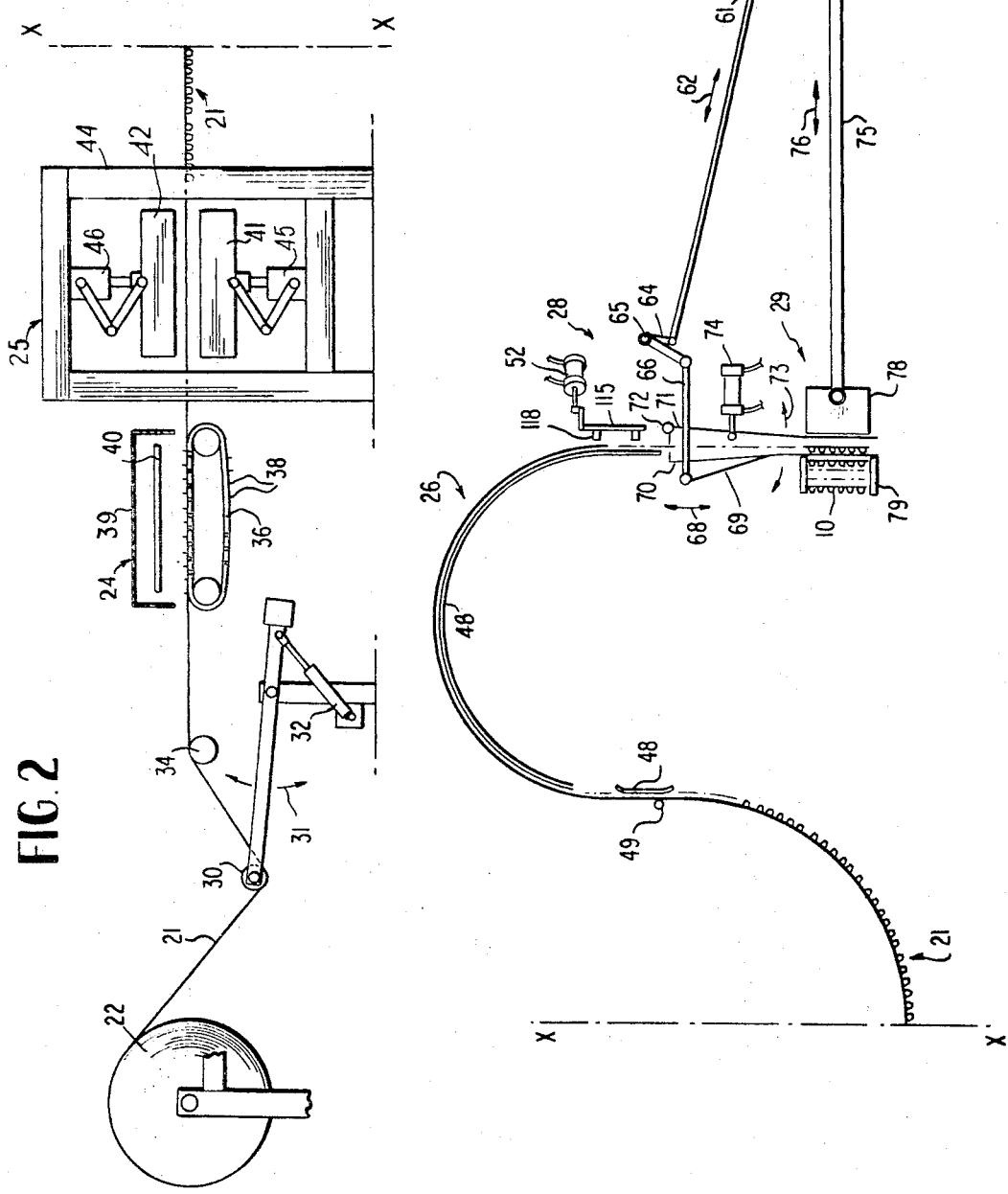

United States Patent Office 3,577,495
Patented May 4, 1971

3,577,495
EGG CARTON FORMING METHOD
David L. Pearl, 55 Enterprise Blvd. SW., Atlanta, Ga. 30336; Beverly P. Head, Jr., 3528 Victoria Road, Birmingham, Ala. 35223; and John G. Waller, 1429 E. Cambridge Ave., College Park, Ga. 30337
Filed July 28, 1969, Ser. No. 845,462
Int. Cl. B26d *1/56;* B29c *17/10*
U.S. Cl. 264—153                                       7 Claims

ABSTRACT OF THE DISCLOSURE

An egg carton forming method wherein a sheet of polystyrene is passed through a predetermined path where the sheet is heated at a first station. A plurality of egg carton impressions each complete with egg tray, lid and locking flap are formed across the width of the sheet at a second station. Latching holes are punched in the lid impressions at a third station, and the egg carton impressions are cut away from the sheet of material at a fourth station.

BACKGROUND OF THE INVENTION

Eggs customarily have been packaged and sold in dozen egg cartons that define individual pockets or cells for each egg and which maintain the eggs in spaced relationship from one another and keep the eggs from cracking when the cartons are jarred or jolted. While egge cartons have been fabricated from cardboard and molded pulp in the past, cartons of this type have more recently been fabricated of expanded polystyrene and other moldable materials which are inexpensive and easy to handle and which have structural strength characteristics strong enough to maintain eggs in a safe environment.

Egg cartons fabricated of expanded polystyrene are water impervious so they do not weaken when they become wet, and the plastic material is soft yet strong and functions to cushion the eggs when the cartons are jarred.

While the expanded polystyrene and similar plastic egg cartons have been widely accepted in the egg industry because they are inexpensive to manufacture and handle and protect the egg better than the cardboard and molded cartons, the problem of latching the carton lid to the egg tray in a secure manner without the necessity of tape or other external adhesive connecting means still remains. Some expanded polystyrene cartons have been molded with the lid latching mechanism molded directly into the carton structure, and comprise protrusions in one portion of the carton, usually a locking flap, which mate with recesses or holes in another portion of the carton, usually the edge of the lid. The cartons having recesses have been only moderately successful since molded recesses formed in the polystyrene material do not function as well as holes to positively latch the lid and egg tray together inasmuch as any recess molded in cartons manufactured of these materials must of necessity have gradually rounded corners because of the ability of the material to accept a mold impression. The gradually rounded corners of such a recess do not function to adequately grip a mating protrusion to securely latch the lid and egg tray together. While latching mechanisms that utilize holes which mate with protrusions to lock the lid to the egg tray function better than recesses, it has been more difficult and expensive to form the holes in the carton material.

SUMMARY OF THE INVENTION

Briefly described, the present invention comprises an egg carton forming method and apparatus which includes means for punching holes in the lid portions of expanded polystyrene cartons. The holes are formed in such a manner that they securely grip the latching protrusions of the egg trays. The process includes passing a sheet of expanded polystyrene along a path, heating the sheet at a first position, forming egg carton impressions in the heated sheet at a second position, punching holes in the lid impressions of the cartons at a third position, and cutting each carton away from the sheet of material at a fourth position. After the carton impressions have been formed in the sheet of material, the sheet is passed in a downward direction, the holes are punched in the lids of the carton impressions, and the carton impressions are then cut from the sheet of material and moved in a lateral direction. As the cartons are cut from the sheet of material they are stacked in a nested relationship with each other so that they can be conveniently packed and shipped. The carton forming process is continuous, and the hole punching function is timed with respect to the step of cutting the cartons away from the sheet of material. The hole punching apparatus is arranged to move with the carton impressions of the sheet as the sheet advances toward the cutting mechanism.

BRIEF DESCRIPTION OF THE DRAWING

FIG. 1 is a perspective view of an egg carton formed by the egg carton forming method and apparatus.

FIG. 2 is a schematic illustration of the egg carton forming method and apparatus.

FIG. 4 is a top plan view of the hole punching method and apparatus.

DESCRIPTION OF THE PREFERRED EMBODIMENT

Figure 3:
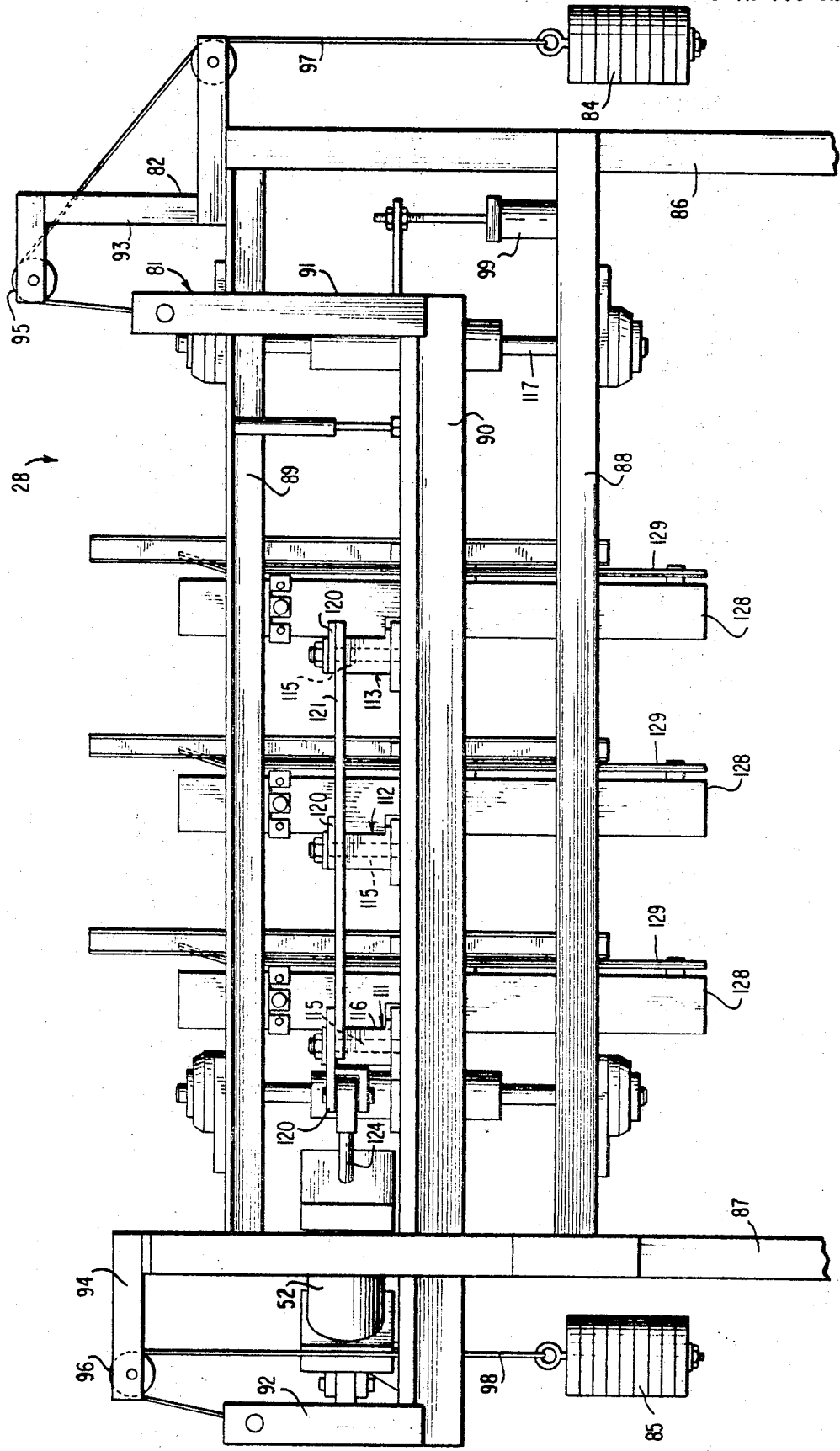
FIG. 3 is a side elevational view of the hole punching apparatus.

Referring now in more detail to the drawing, in which like numerals indicate like parts throughout the several views, FIG. 1 shows an egg carton 10 which includes egg supporting tray 11, lid 12, and locking flap 13. Egg tray 11 defines a plurality of external protrusions 14 which define internal cavities suitable for individually supporting eggs. A plurality of center posts (not shown) extend upwardly between each four adjacent protrusions 14 toward lid 12. Lid 12 is generally of flat, but non-planar rectangular configuration as it includes external recess 15 extending centrally along its length. Recess 15 forms a plurality of support posts which extend internally of lid 12 down toward egg tray 11 to meet the support posts of the egg tray, so that the lid and the egg tray are supported from each other centrally along their respective lengths. Egg tray 11 and lid 12 are fabricated of a single sheet of material which is uncut along their mutual edges 16 to form a hinge structure that allows lid 12 to be pivoted into opened and closed relationship with tray 11.

Lid 12 defines a pair of spaced holes 18 at its edge opposite from hinge 16, and locking flap 13 includes a pair of spaced protrusions 19 which mate with holes 18. When lid 12 is pivoted into closed relationship with tray 11, locking flap 13 is tucked inside lid 12 so that protrusions 19 register with holes 18. This functions to lock tray 11 and lid 12 together.

As is shown in FIG. 2, the egg cartons of FIG. 1 are manufactured by passing a sheet of material 21, such as expanded polystyrene, from a roll or supply 22 through a path to form the cartons in a continuous process. Sheet 21 is passed from roll 22 to heater 24, mold 25, cooling hoop 26, hole punches 28, and cutter 29. The sheet of material is pulled from roll 22 by oscillating roller 30 which oscillates in the directions indicated by arrows 31 under the influence of hydraulic piston 32. The sheet of material passes over guide roller 34 toward heater 24. A pair of spaced chain conveyors 36 are positioned in heater 24 below the path of the sheet material and include spikes 38 which impale the edges of sheet 21. Chain conveyors 36 function to advance sheet 21 in spaced increments through heater 24 toward mold 25. Since the spikes 38 of chain conveyors 36 impale sheet 21 at its edges, the sheet is maintained in positive driven relationship and in positive alignment with conveyors 36 as it advances toward mold 25. Hydraulic cylinder 32 functions to move oscillating roller 30 in a downward direction to pull an additional length of sheet 21 from roller 22 as chain conveyors 36 are at rest, and when chain conveyors 36 are advanced to pull sheet 21 into heater 24, hydraulic cylinder 32 functions to lift oscillating roller 30. Heating elements 40 are positioned within housing 39 of heater 24, and housing 39 insures that the heat from elements 40 does not freely escape to the atmosphere.

Mold 25 includes lower and upper mating mold elements 41 and 42 which are reciprocally supported from a frame 44 and are moved toward and away from each other by means of hydraulic rams 45 and 46. The movement of the mold elements in relation to the movement of the sheet material is controlled so that the sheet 21 is advanced between the mold elements as the mold elements are spaced apart, and the sheet stops as the mold elements are urged together.

When mold elements 41 and 42 part, sheet 21 will have a plurality of egg carton impressions stamped or molded therein. The increments of movement of sheet 21 is such that the sheet only moves a distance sufficient to withdraw the impressions formed therein from between mold elements 41 and 42 so that the next cycle of the mold elements functions to form an impression spaced closely adjacent the previous impression. With this arrangement very little of sheet 21 is wasted. Sheet 21 is of a width sufficient to form several complete egg carton impressions across its width, with the longer dimension of the egg cartons extending along the length of the sheet. The egg carton impressions are formed with the lids of the cartons extending toward one side of the sheet and the trays of the cartons extending toward the opposite side of the sheet. The length of mold elements 41 and 42 extending along the path of travel of sheet 21 is sufficient to impress several rows of egg cartons into the sheet along the length of the sheet.

As sheet 21 emerges from mold 25, it is extended in an upwardly curved path toward cooling hoop 26. A plurality of guide rails 48 extend in a curved path to guide sheet 21 first in an upward direction and then in a curved path back toward a downward direction. Guide bar 49 is spaced outwardly from and laterally of guide rails 48, and sheet 21 extends between guide bar 49 and guide rails 48 to insure that the convex impressions of sheet 21 engage and fit around guide rails 48. When sheet 21 is properly threaded between guide bar 49 and guide rails 48, the guide rails will fit into the spaces of sheet 21 which extend between adjacent rows of egg carton impressions in the sheet.

As sheet 21 extends in a downward direction as determined by guide rails 48, it passes adjacent hole puncher 28. Hole puncher 28 includes a pneumatic ram 52 which oscillates a plurality of hole punching arms into engagement with the lid portion of each carton impression, to punch the holes 18 in the lids of each carton impression.

Cutter 29 includes a drive shaft 54 which is driven by any convenient power means, such as an electric motor (not shown). Drive shaft 54 functions to rotate fly wheel 55, cam 56, and crank link 58. Roller 59 engages cam 56 at the upper end of floor link 60 and at the driven end of connecting link 61, and functions to move connecting link 61 in the direction as indicated by arrows 62. Driving link 64 is connected to the other end of connecting link 61 and functions to oscillate shaft 65. The function of shaft 65 is to oscillate sheet advancer 66 in the direction as indicated by arrows 68, and prongs 69 engage the convex protrusions of sheet 21. The movement of sheet advancer 66 is such that prongs 69 move a distance sufficient to engage the end portions of one length of carton impressions upon each cycle and to advance the sheet a distance of one carton length in a downward direction toward cutter 29.

Guide bars 70 and 71 are positioned on opposite sides of sheet 21 and are pivotal about axle 72. Pneumatic cylinder 74 functions to oscillate guide bars 70 and 71 about axle 72 in the directions as indicated by arrows 73. Crank link 58 connected to drive shaft 54 functions to oscillate ram 75 in the directions as indicated by arrows 76. Cutter die 78 is carried by ram 75 and moves against cutter die 79. Guide bars 70 function to guide sheet 21 down between cutter dies 78 and 79, and pneumatic cylinder 74 functions to move guide bar 70 toward cutter die 79 to extend the convex protrusions of sheet 21 into the openings of cutter die 79. Cutter die 78 is then pressed against cutter die 79 by ram 75, and functions to individually cut each egg carton impression from sheet 21. The egg cartons can then move through the openings in cutter die 79 while the remainder of sheet 21 advances in a downward direction as cutter die 79 and sheet advancer 66 recycles. Hole puncher 28 is spaced a distance as may be desired above cutter 29 so that sheet 21 advances a distance of one to six carton lengths after having holes punched in the lid impressions before having the cartons cut from the sheet.

As is best shown in FIGS. 3 and 4, hole puncher 28 comprises a movable frame 81 supported by stationary frame 82 and counterweights 84 and 85. Stationary frame 82 includes end vertical support bars 86 and 87, and horizontal support bars 88 and 89. Movable frame 81 includes horizontal support platform 90 which is separated into laterally spaced front and rear portions 90a and 90b (FIG. 4), and end vertical support bars 91 and 92. Pulley supports 93 and 94 are connected to the end upper portions of stationary frame 82 and support pulleys 95 and 96, and counterweights 84 and 85 are connected to cables 97 and 98 which extend over pulleys 95 and 96 and are connected to the end vertical support bars 91 and 92 of movable frame 81. Counterweights 84 and 85 are of sufficient weight to counterbalance and support movable frame 81 and the equipment it supports. Pneumatic ram 99 functions to periodically urge movable frame 81 in an upward direction to its uppermost position.

Movable feelers or clamps 100, 101, and 102 are supported by front portion 90a of horizontal support platform 90 of movable frame 81. As is shown in FIG. 4, each clamp 100, 101, and 102 includes a head 104, support bars 105 which extend through support bracket 106, pneumatic cylinder 108, and extension rod 109. Pneumatic cylinder 108 functions to reciprocate its extension rod 109, head 104 and support bars 105 in the directions as indicated by arrows 110.

As is shown in FIG. 3, three hole punchers 111, 112, and 113 are supported from the front portion 90a of horizontal support platform 90 of movable frame 81. Each hole puncher 111, 112, and 113 includes a vertically extending axle 115 supported by bushing 116. A pair of spaced apart punching arms 118 (FIG. 4) extend from and are rigidly connected to axle 115, and punching heads 119 protrude from the sides of punching arms 118. A crank arm 120 is connected to each axle 115, and the three crank arms 120 are connected together by connecting link 121. Air cylinder 52 has its piston rod 124 connected to connecting link 121 in such a manner that the reciprocal movement of piston rod 124 causes connecting link 121 to move in the directions as indicated by arrows 125 to rotate crank arms 120, axles 115 and punching arms 118. Die blocks 126 are connected to the rear portion 90b of horizontal support platform 90 and project toward axles 115. Die blocks 126 define openings therein which mate with punching heads 119 of the hole punchers. Vertically extending flat guides 128 are supported from rear portion 90b of horizontal support platform 90 and spaced across from hole punchers 111, 112, and 113. Side guide bars 129 are also connected to rear portion 90b of support platform 90 and are positioned adjacent vertical guides 128. Die blocks 126, vertical guides 128, and side guide bars 129 define recesses or channels corresponding to the shape of heads 104, which also correspond to the shape of the lid portion of the egg carton impressions of sheet 21. These elements are spaced apart a distance sufficient to accommodate egg tray portions 11 of the egg carton impressions of sheet 21.

As is shown in FIG. 2, fly wheel 55 includes a plurality of protrusions 130 about its periphery, and a bank of switches 131 is supported adjacent fly wheel 55. Protrusions 130 actuate the switches of the bank of switches, to energize solenoids (not shown), which communicate a source of pressure, either air or hydraulic, with the various pneumatic cylinders of the hole puncher 28 and cutter 29. For instance, air cylinder 52 of hole puncher 28 is energized by actuating a solenoid from one of the switches of the bank of switches 131, and the solenoid communicates the air pressure source (not shown) with air cylinder 52. This operates hole punchers 111, 112, and 113. Also, the air cylinders 108 of the feelers or clamps 100, 101, and 102 and ram 74 of guide bar 70 (FIG. 2) are energized in a similar manner. Thus, the various movemets of the elements of the apparatus are synchronized with respect to each other by the placement of protrusions 130 about fly wheel 55.

OPERATION

When the egg carton forming apparatus is placed into operation, a sheet of material 21, such as expanded polystyrene, is threaded from the roll of material 22 beneath oscillating roller 30, over guide roller 34 and impaled at its side edges by the spikes 38 of spaced chain conveyors 36. In operation, oscillating roller 30 unreels the sheet material 21 from the roll 22, and chain conveyors 36 advance the sheet through heater 24 toward mold 25 in spaced increments of movement. When the sheet 21 passes between mold elements 41 and 42, these elements are urged into engagement with sheet 21 by their respective rams 45 and 46, and mold elements 41 and 42 form egg carton impressions in sheet 21. Mold elements 41 and 42 are of a configuration such that several entire egg carton impressions are formed in the sheet material upon one cycle of mold 25, with the longitudinal axis of the egg carton impressions extending along the path of movement of sheet 21, and with, for example, three carton impressions being spaced across the width of the sheet.

As sheet 21 emerges from mold 25, it is still in continuous form and is passed between guide bar 49 and guide rails 48 of cooling hoop 26.

Sheet 21 passes over the curvature of guide rails 48 and moves in a downward direction past hole puncher 28 and cutter 29. Sheet advancer 66 of cutter 29 functions to oscillate prongs 69 in the direction indicated by arrows 68, and prongs 69 engage the end portions of the three egg carton impressions extending across the sheet to advance the sheet by the length of a single egg carton impression upon each cycle. In the meantime, hole puncher 28 is in operation and feelers or clamps 100, 101, and 102 are thrust into the lid portions of the impressions of sheet 21, at a position adjacent the ends of the carton impressions, so that the ends of the carton impressions tend to move in a downward direction against the upper surfaces of the heads 104 of clamps 100, 101, and 102. This exerts a downward force against heads 104, and tends to move the entire movable frame 81 of hole puncher 28 in a downward direction with sheet 21. After the heads 104 have moved to their respective positions inside the lid impressions of the carton impressions, air cylinder 52 is energized to move connecting link 121 to the right (FIG. 4), which rotates punching arms 118 into the lid impressions of the cartons, so that punching heads 119 engage the side portions of the lids. Punching heads 119 move toward the openings (not shown) in die blocks 126, and the movement functions to punch holes in the lids of the carton impressions. Since two holes are formed in each die block and since each hole puncher includes two punching arms carrying punching heads 119, a pair of spaced holes are formed in the cartons. The spacing of holes 18 (FIG. 1) corresponds to the spacing of protrusions 14 in the locking flap of the cartons.

The movement of air cylinder 52 is momentary so that punching arms 118 which are moved into the confines of the lid impressions are withdrawn from the lid impressions, and the heads 104 of clamps 100, 101, and 102 are subsequently withdrawn from the lid impressions, so that the sheet is free to pass on toward cutter 29 without having to carry hole puncher 28 and its movable frame 81 any further. Thus, each carton impression has its latching holes properly punched as it approaches cutter 29.

After the holes have been cut in the cartons, air cylinder 99 (FIG. 3) is energized to thrust movable frame 81 in an upward direction so that it is at its uppermost position with respect to stationary frame 82 before the hole puncher recycles.

In the embodiment illustrated in the drawing, the sheet of material is advanced four times between hole puncher 28 and cutter 29 by sheet advancer 66, and ram 74 of cutter 29 functions to pivot guide bars 70 and 71 as indicated by arrows 77 and move the convex or outer portion of the carton impressions into the openings of cutter die 79 after the third downward movement of the sheet so that when cutter die 78 is thrust into engagement with the cartons it will engage primarily only the portion of the carton that is to be cut away. As cutter die 78 is withdrawn from cutter die 79, ram 74 functions to pivot guide bars 70 in the reverse direction so that when sheet advancer 66 cycles, the sheet 21 will be guided between cutter die 78 and cutter die 79.

Egg cartons 10 are stacked in a nested relationship as they pass through the openings of the cutter die 70, and a workman merely gathers the nested cartons and places them in a box or the like for shipping. The waste portion of sheet 21 continues to pass in a downward direction after the cartons have been removed therefrom.

The free movement of movable frame 81 of hole puncher 28 enables it to compensate for any slight misalignment that might be encountered between the structural elements of the apparatus or differences in the distance between rows of cartons, and feelers or clamps 100, 101, and 102 function to positively place the hole puncher at a prescribed position with respect to the cartons, so that the holes are always punched in the proper location within the lid impression of a particular carton. Furthermore, the floating action of hole puncher 28 is such that it does not interfere with the function of cutter 29, and sheet advancer 66 functions independently of hole puncher 28.

When punching holes in polystyrene and other materials it is desirable to have the punching movements travel at a right angle toward the plane of the material. When the angle between the plane of the material and punching movement exceeds twenty degrees from a right angle, the carton around the holes formed by such a punching movement begins to crack and split. The angle of the lids 12 about holes 18 is disposed at an attitude far beyond the practical limit of twenty degrees from the original plane of the continuous sheet and a straight punching movement toward the plane of sheet 21 to form holes 18 in the carton impressions is not practical.

The rotational movement of punching arms 118 enables holes 18 to be formed in portions of the carton impressions that are disposed at extreme angles—more than twenty degrees—with respect to the original plane of the continuous sheet and the plane of movement of the continuous sheet. These portions of the lid impressions are disposed at an angle approximately seventy-five degrees with respect to the original plane of the continuous sheet, and the punching movements are substantially at a right angle with respect to the portions of the cartons about holes 18 since the punching arms reach into the confines of the lid impression to perform the hole punching step. In the meantime, the free movement of movable frame 81 enables the hole punching step to be carried out without interfering with any of the other movements in the process.

While this invention has been described in detail with particular reference to preferred embodiments thereof, it will be understood that variations and modifications can be effected within the spirit and scope of the invention as described hereinbefore and as defined in the appended claims.

We claim:

1. A continuous process of forming egg cartons or the like comprising:
   passing a sheet of material along a predetermined path,
   heating the sheet,
   continually forming a plurality of rows of carton impressions in the heated sheet across the direction of movement of the sheet,
   inserting a portion of a hole puncher into each row of carton impressions as the sheet is moved along said path wherein the movement of the carton impressions against the portion of the hole puncher moves the hole puncher with the carton impressions,
   forming holes with the hole puncher in each carton impression of the row of carton impressions engaged by the hole puncher,
   withdrawing the hole puncher from the sheet, and
   cutting each egg carton away from the sheet of material.

2. The invention of claim 1 wherein the process of passing the sheet of material along a predetermined path comprises continually advancing the sheet of material in a lateral direction in predetermined lengths corresponding to the length of the several rows of carton impressions continually formed across the sheet, and continually advancing the sheet of material predetermined lengths corresponding to a single row of carton impressions across the sheet as the carton are cut away from the sheet.

3. The invention of claim 1 wherein the step of forming a plurality of egg carton impressions in the sheet of heated material comprises forming three egg carton impressions across the width of the material with the carton lid impressions disposed alternately with respect to the carton bottom impressions.

4. The invention of claim 3 wherein the step of forming holes in each carton impression comprises forming at least one hole in the lid impression of each carton impression as the sheet of material advances in its path.

5. In a continuous process of forming cartons or the like wherein a plurality of rows of carton impressions are molded at spaced intervals along the length of a continuous sheet of material and the sheet is passed along a predetermined path, the improvement therein of passing the sheet of material in a downward direction, inserting a portion of a balanced hole puncher into each row of carton impressions as the sheet moves in a downward direction wherein the movement of the carton impressions against the portion of the hole puncher moves the hole puncher with the carton impressions, punching at least one hole in each carton impression with the hole puncher during the downward movement of the hole puncher, withdrawing the portion of the hole puncher from the sheet, and subsequently moving the hole puncher in an upward direction to reposition the hole puncher for the next successive row of carton impressions.

6. The process of claim 5 wherein the portion of the hole puncher inserted into each row of carton impressions comprises at least one feeler element.

7. A method of forming egg cartons or the like comprising:
   successively molding a plurality of rows of carton impressions across the length of a continuous sheet of material with a mold,
   intermittently passing the continuous sheet of material from the mold in lengths of material greater than the lengths of the mold impressions,
   intermittently passing the continuous sheet of material toward a cutter in lengths of material approximately equal to the length of one row of carton impressions and the space between adjacent rows of carton impressions,
   successively inserting a portion of a hole puncher into each row of carton impressions as the sheet is moved toward said cutter wherein the movement of the carton impressions against the portion of the hole puncher moves the hole puncher with the carton impressions,
   punching holes in each row of carton impressions with said hole puncher, withdrawing the hole puncher from the sheet and cutting each carton away from the sheet of material.

References Cited

UNITED STATES PATENTS

| | | | |
|---|---|---|---|
| 3,503,097 | 3/1970 | Krupp, Jr. | 264—156X |
| 3,504,074 | 3/1970 | Snow | 264—153 |
| 1,811,412 | 6/1931 | Whitacre | 264—(UX) |
| 3,075,422 | 1/1963 | Schultz | 83—319 |
| 3,148,103 | 9/1964 | Gallagher | 229—2.5X |
| 3,240,851 | 3/1966 | Scalora | 264—297X |
| 3,281,516 | 10/1966 | Southwick | 264—156X |
| 3,326,443 | 6/1967 | Burkett | 229—2.5 |
| 3,373,642 | 3/1968 | Simpson | 83—319X |
| 3,458,108 | 7/1969 | Howarth | 229—2.5 |
| 3,469,764 | 9/1969 | Gaylor | 229—2.5 |

ROBERT F. WHITE, Primary Examiner

A. M. SOKAL, Assistant Examiner

U.S. Cl. X.R.

264—156; 83—185, 319; 18—19